(12) United States Patent
Yang (10) Patent No.: US 7,530,606 B1
(45) Date of Patent: May 12, 2009

(54) QUICK PIPE CONNECTOR

(76) Inventor: Richard Yang, 1454 Culpepper Dr., Naperville, IL (US) 60540

( * ) Notice: Subject to any disclaimer, the term of this patent is extended or adjusted under 35 U.S.C. 154(b) by 0 days.

(21) Appl. No.: 11/969,752

(22) Filed: Jan. 4, 2008

(51) Int. Cl.
*F16L 21/02* (2006.01)
(52) U.S. Cl. .................. 285/340; 285/308; 285/313; 285/314
(58) Field of Classification Search .......... 285/314, 285/313, 321, 319, 340, 308
See application file for complete search history.

(56) References Cited

U.S. PATENT DOCUMENTS

| | | | | |
|---|---|---|---|---|
| 4,630,848 A * | 12/1986 | Twist et al. | ............ | 285/308 |
| 4,919,457 A * | 4/1990 | Moretti | ............ | 285/308 |
| 5,160,179 A * | 11/1992 | Takagi | ............ | 285/340 |
| 5,193,856 A * | 3/1993 | Suzuki | ............ | 285/315 |
| 5,292,157 A * | 3/1994 | Rubichon | ............ | 285/340 |
| 5,553,901 A * | 9/1996 | Serot | ............ | 285/340 |
| 6,145,887 A * | 11/2000 | Cambot-Courrau | ............ | 285/340 |
| 6,685,230 B1 * | 2/2004 | Bottura | ............ | 285/340 |
| 6,824,172 B1 * | 11/2004 | Komolrochanaporn | ............ | 285/340 |
| 7,063,359 B2 * | 6/2006 | Vallee | ............ | 285/308 |

* cited by examiner

*Primary Examiner*—David E Bochna
(74) *Attorney, Agent, or Firm*—Choate, Hall & Stewart, LLP; Christopher J. McKenna (57) ABSTRACT

A quick pipe connector includes a tubular housing defining an axis, and a connecting unit. The connecting unit includes a grip ring adapted to grip a water pipe, and a locking ring abutting against a first housing shoulder surface of the tubular housing and positioning the grip ring to abut against a second housing shoulder surface of the tubular housing. The locking ring has a slit that extends parallel to the axis. An inner ring surface of the locking ring includes an annular inner shoulder part transverse to the axis. A release ring is formed with a stop surface confronting the annular inner shoulder part, and is movable along the axis relative to the locking ring to a release position, where the stop surface is moved away from the annular inner shoulder part and where the release ring forces the grip ring to release gripping action on the water pipe.

10 Claims, 9 Drawing Sheets

QUICK PIPE CONNECTOR

BACKGROUND OF THE INVENTION

1. Field of the Invention

The invention relates to a connector, more particularly to a quick pipe connector.

2. Description of the Related Art

Figure 1:
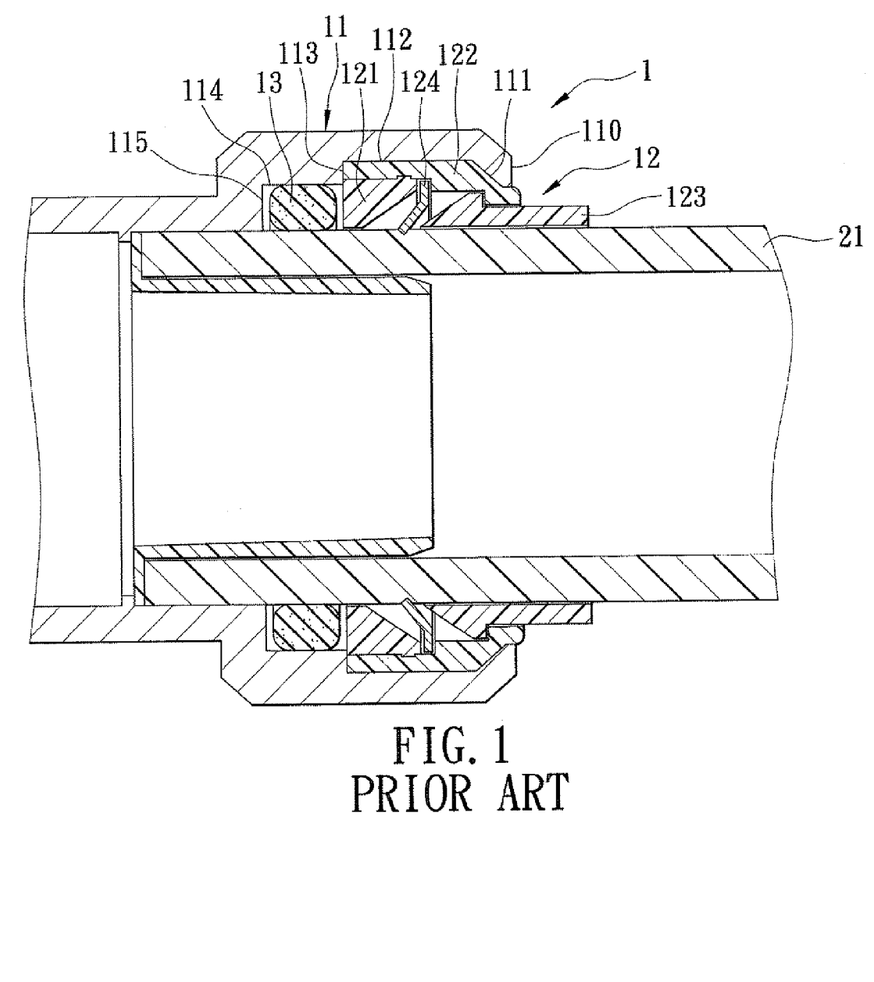
FIG. 1 is a sectional view of a conventional quick pipe connector, illustrating a release ring of a connecting unit disposed at a non-release position.
Figure 2:
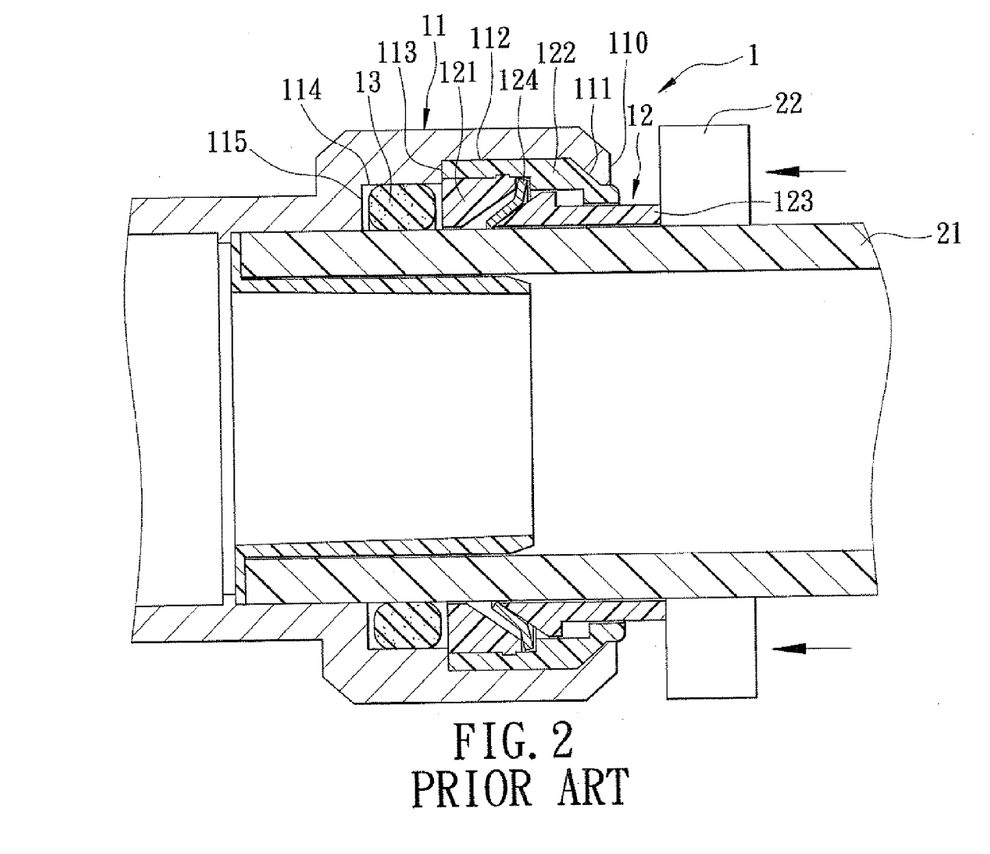
FIG. 2 is a sectional view of the conventional quick pipe connector, illustrating the release ring of the connecting unit disposed at a release position.

As shown in FIG. 1 and FIG. 2, a conventional quick pipe connector 1 is adapted to quickly connect to and disconnect from a pipe 21. The conventional quick pipe connector 1 includes a metal tubular housing 11, a connecting unit 12 and a seal ring 13.

The tubular housing 11 defines an axis, and has an end face 110, a first shoulder surface 111, a first inner housing surface 112, a second shoulder surface 113, a second inner housing surface 114, and a third shoulder surface 115. The first shoulder surface 111 extends radially and outwardly relative to the axis from the end face 110. The first inner housing surface 112 has a radial dimension greater than that of the second inner housing surface 114. The connecting unit 12 includes an inner locking ring 121, an outer locking ring 122 sleeved on the inner locking ring 121, a release ring 123 extending into the outer locking ring 122, and a grip ring 124 disposed in the outer locking ring 122. The seal ring 13 is disposed in the tubular housing 11 and is adapted to abut sealingly against an end portion of a water pipe 21 disposed in the tubular housing 11.

Assembly of the conventional quick pipe connector 1 includes the following steps:

1. The seal ring 13 is disposed in the tubular housing 11, which has yet to be formed with the first shoulder surface 111.

2. The inner locking ring 121 is disposed in the tubular housing 11.

3. The grip ring 124 is disposed in the tubular housing 11.

4. The release ring 123 is inserted into the outer locking ring 122 from left to right of FIG. 1 such that the release ring 123 is partially extended outside of the outer locking ring 122.

5. The assembly of the outer locking ring 122 and the release ring 123 is disposed in the tubular housing 11 from right to left such that the outer locking ring 122 is sleeved on the inner locking ring 121.

6. One end of the tubular housing 11 proximate to the end face 110 is contracted by a processing tool (not shown) such that the first shoulder surface 111 is formed to abut against the outer locking ring 122.

After the conventional quick pipe connector 1 is assembled, the release ring 123 is movable between a release position (shown in FIG. 2) and a non-release position (shown in FIG. 1). With reference to FIG. 1, the end portion of the water pipe 21 can be inserted into the conventional quick pipe connector 1 to be gripped by the grip ring 124 when the release ring 123 is disposed at the non-release position. With reference to FIG. 2, in order to move the release ring 123 to the release position, it is required to use a U-shaped pushing tool 22 to push the release ring 123 to force the grip ring 124 to release gripping action on the end portion of the water pipe 21, at which time the water pipe 21 may be removed from the tubular housing 11 of the conventional quick pipe connector 1.

The conventional quick pipe connector 1 has the following shortcomings:

1. Since the connecting unit 12 includes four components 121~124, the structure of the conventional quick pipe connector 1 is relatively complicated.

2. Six steps and a processing tool are required to assemble the conventional quick pipe connector 1, making the assembly process of the conventional quick pipe connector 1 relatively difficult.

3. Since contraction of the tubular housing 11 to form the first shoulder surface 111 is required to assemble the conventional quick pipe connector 1, the tubular housing 11 cannot be provided with screw threads on an outer surface thereof. Consequently, the conventional quick pipe connector 1 cannot facilitate connection of an outer cap around the tubular housing 11, thereby limiting the application of the conventional quick pipe connector 1.

4. Since water pressure acts directly on the seal ring 13, and since the connecting unit 12 is not isolated from the seal ring 13, damages may result in the connecting unit 12 when the water pressure is too high. Therefore, the conventional quick pipe connector 1 is insufficient in its durability.

5. Since a structural protection of the first shoulder surface 111 of the tubular housing 11 is not provided, damages to the first shoulder surface 111, and in turn to the connecting unit 12, cannot be prevented when the conventional quick pipe connector 1 is dropped on the floor.

6. Since the U-shaped pushing tool 22 is required to move the release ring 123 to the release position, the conventional quick pipe connector 1 is not convenient to use.

SUMMARY OF THE INVENTION

Therefore, an object of the present invention is to provide a quick pipe connector that is relatively simple in structure, easy to assemble, convenient to use, and widely applicable as compared to the prior art.

According to embodiments of the present invention, there is provided a quick pipe connector that is adapted for connecting to and disconnecting from a water pipe. The quick pipe connector includes a tubular housing, a connecting unit and a seal ring.

The tubular housing includes a housing wall that defines an axis and a receiving space adapted for receiving an end portion of the water pipe, and that has an end face, a first annular inner housing surface, a second annular inner housing surface, a first housing shoulder surface, a third annular inner housing surface, and a second housing shoulder. The first annular inner housing surface is connected to the end face. The second annular inner housing surface is disposed proximate to one end of the first annular inner housing surface opposite to the end face, and has a radial dimension relative to the axis that is larger than that of the first annular inner housing surface. The first housing shoulder surface interconnects the first and second annular inner housing surfaces. The third annular inner housing surface is disposed proximate to one end of the second annular inner housing surface opposite to the first housing shoulder surface, and has a largest radial dimension relative to the axis that is smaller than that of the second annular inner housing surface. The second housing shoulder surface interconnects the second and third annular inner housing surfaces.

The connecting unit includes a grip ring, a locking ring and a release ring. The grip ring is disposed in the receiving space of the tubular housing and is adapted to grip the end portion of the water pipe in the receiving space. The locking ring is disposed in the receiving space such that the locking ring abuts against the first housing shoulder surface and positions the grip ring in the receiving space so that the grip ring abuts against the second housing shoulder surface. The locking ring has an outer ring surface, an inner ring surface opposite to the outer ring surface in radial directions relative to the axis, and a slit extending parallel to the axis from the inner ring surface to the outer ring surface. The inner ring surface includes an annular inner shoulder part disposed transverse to the axis. The release ring extends into the locking ring, is formed with a stop surface that confronts the annular inner shoulder part of the inner ring surface of the locking ring, and is movable along the axis relative to the locking ring to a release position, where the stop surface is moved away from the annular inner shoulder part of the inner ring surface of the locking ring and where the release ring forces the grip ring to release gripping action on the end portion of the water pipe in the receiving space. The seal ring is disposed in the receiving space and is adapted to abut sealingly against the end portion of the water pipe in the receiving space.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION

Figure 3:
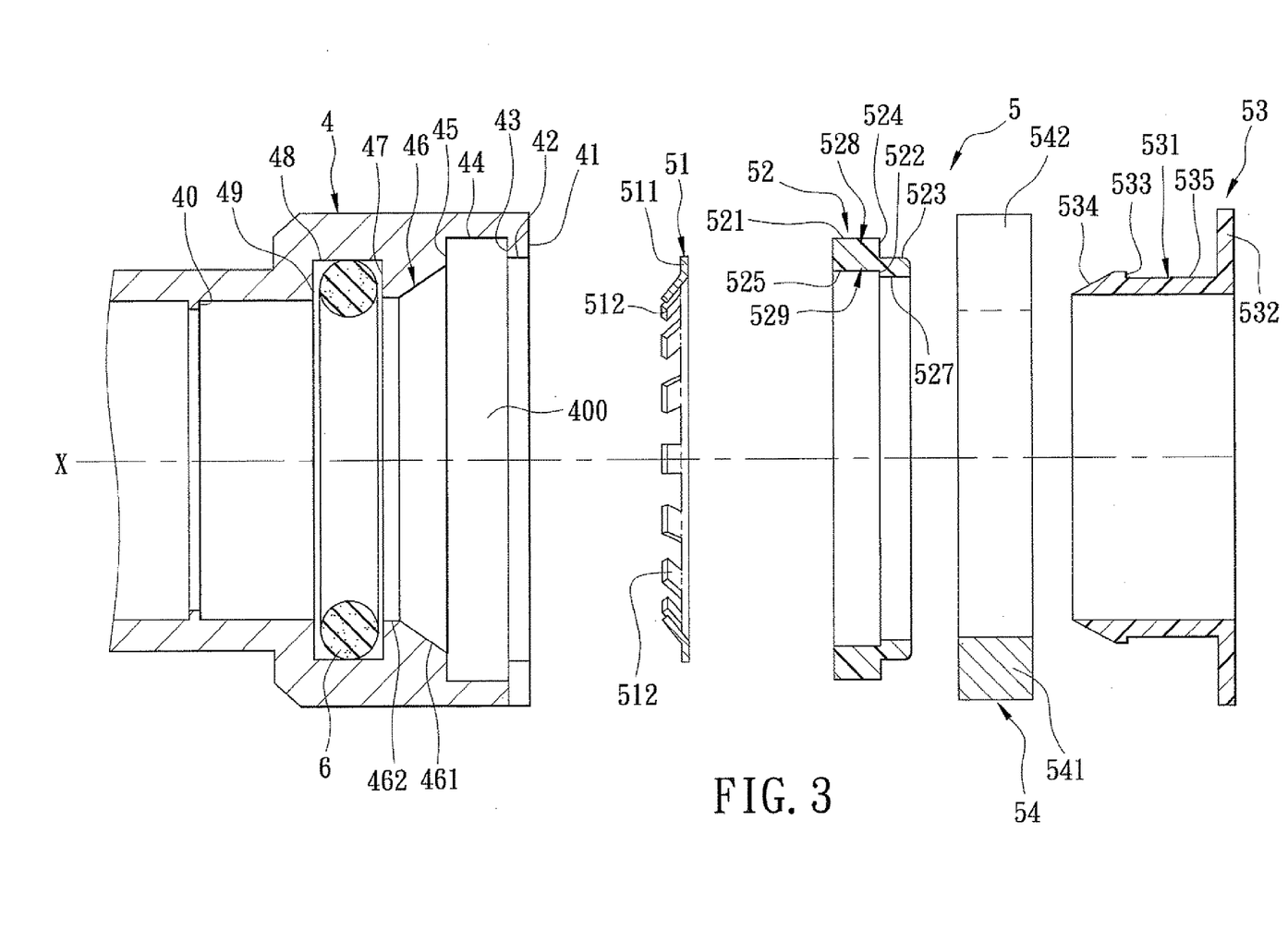
FIG. 3 is an exploded sectional view of an embodiment of a quick pipe connector according to the present invention.
Figure 4:
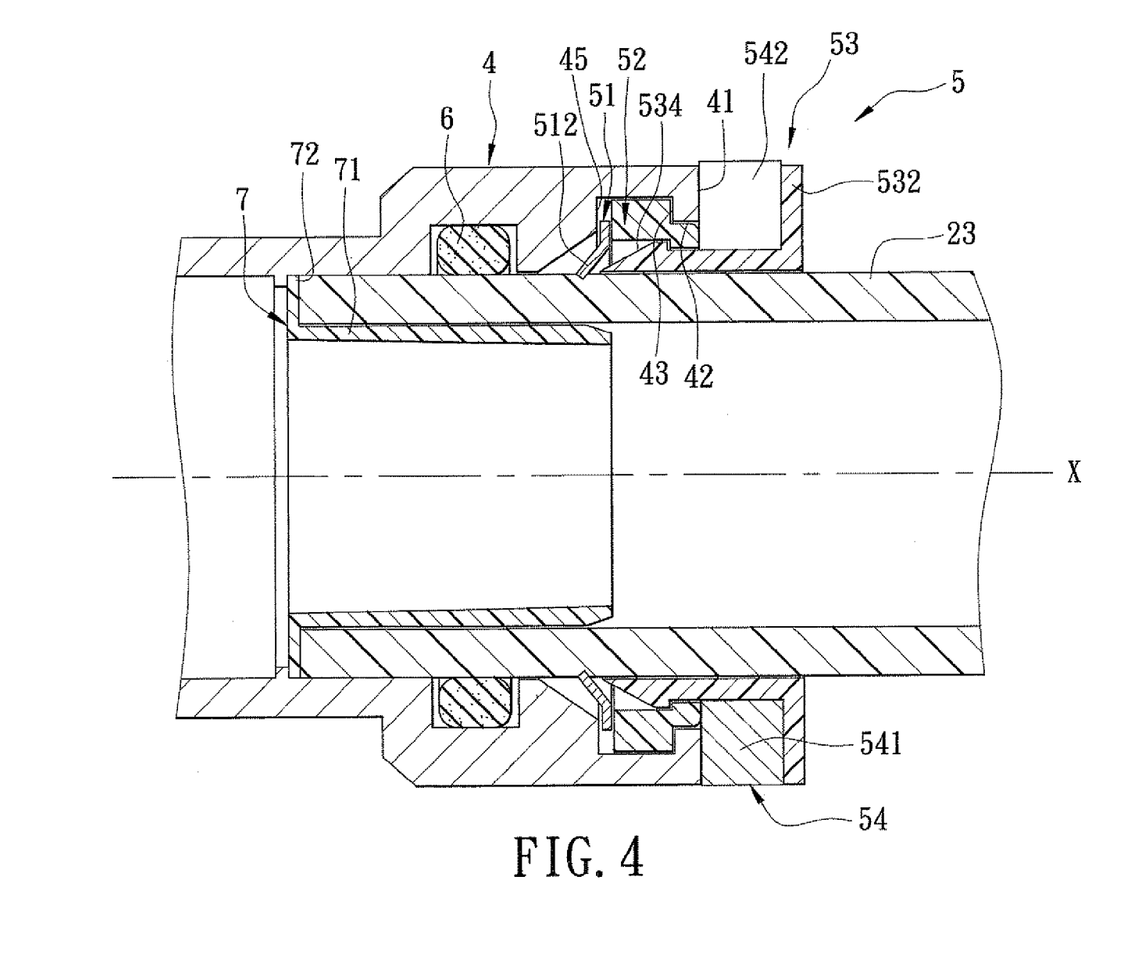
FIG. 4 is an assembled sectional view of the embodiment of FIG. 3, illustrating a release ring of a connecting unit disposed at a non-release position.
Figure 5:
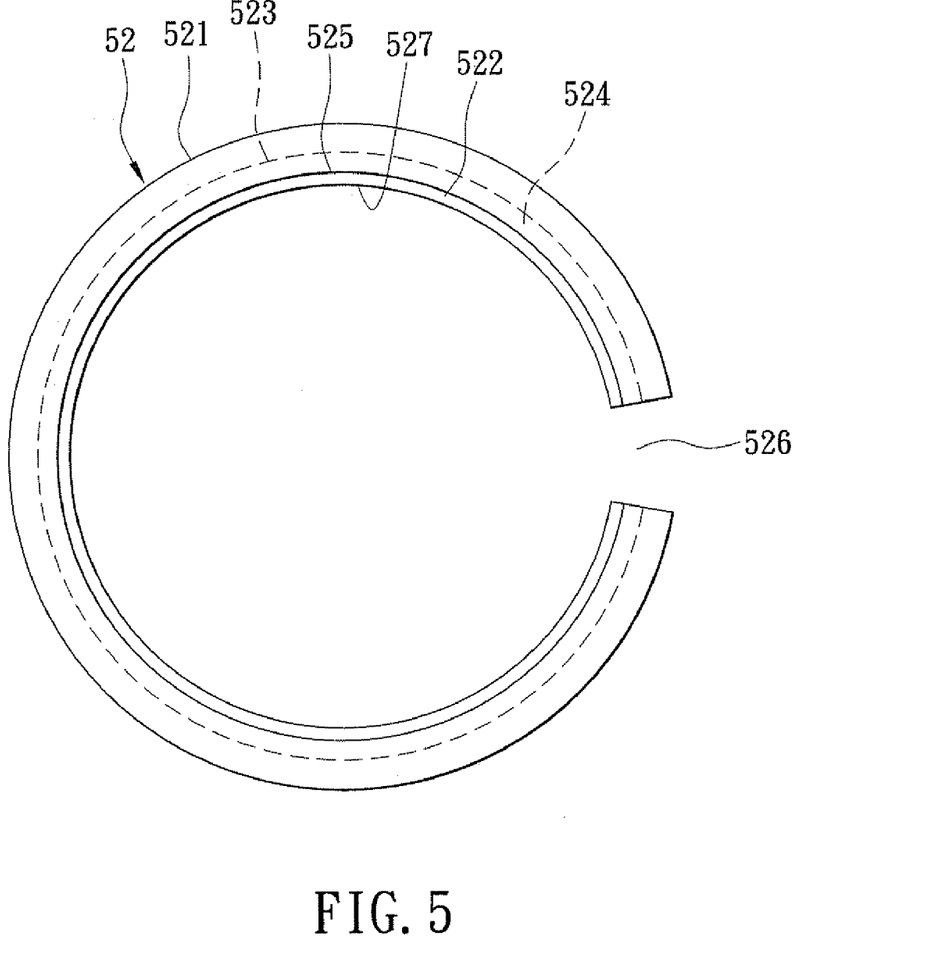
FIG. 5 is a side view of an embodiment of a locking ring of the connecting unit.

As shown in FIG. 3, FIG. 4 and FIG. 5, an embodiment of a quick pipe connector of the present invention is adapted for connecting to and disconnecting from a water pipe 23. The water pipe 23 can be made from one of cross-linked polyethylene (PEX), chlorinated polyvinyl chloride (CPVC), and copper (Cu), and can have pipe sizes ranging from ⅜" to 2" and the metric equivalents. The quick pipe connector includes a tubular housing 4, a connecting unit 5, a seal ring 6, and an inner support tube 7.

The tubular housing 4 includes a housing wall that defines an axis (X) and a receiving space 400 adapted for receiving an end portion of the water pipe 23. The housing wall has an end face 41, a first annular inner housing surface 42 connected to the end face 41, a second annular inner housing surface 44 disposed proximate to one end of the first annular inner housing surface 42 opposite to the end face 41 and having a radial dimension relative to the axis (X) that is larger than that of the first annular inner housing surface 42, a first housing shoulder surface 43 interconnecting the first and second annular inner housing surfaces 42, 44, a third annular inner housing surface 46 disposed proximate to one end of the second annular inner housing surface 44 opposite to the first housing shoulder surface 43 and having a largest radial dimension relative to the axis (X) that is smaller than that of the second annular inner housing surface 44, and a second housing shoulder surface 45 interconnecting the second and third annular inner housing surfaces 44, 46.

Figure 6:
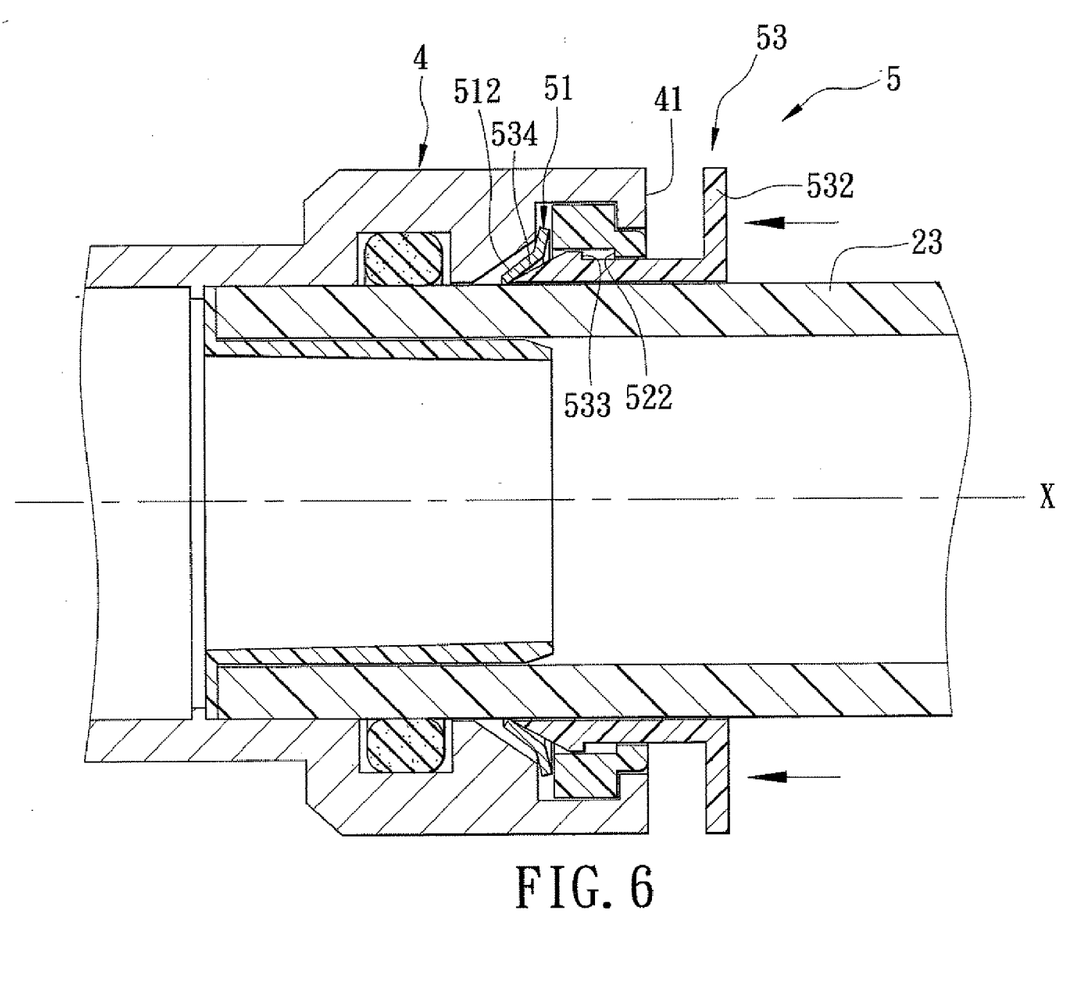
FIG. 6 is an assembled sectional view of the embodiment of FIG. 3, illustrating an embodiment of the release ring of the connecting unit disposed at a release position.

The connecting unit 5 includes a grip ring 51, a locking ring 52, and a release ring 53. The grip ring 51 is disposed in the receiving space 400 of the tubular housing 4 and is adapted to grip the end portion of the water pipe 23 in the receiving space 400. The locking ring 52 is disposed in the receiving space 400 such that the locking ring 52 abuts against the first housing shoulder surface 43 and positions the grip ring 51 in the receiving space 400 so that the grip ring 51 abuts against the second housing shoulder surface 45. The locking ring 52 has an outer ring surface 528, an inner ring surface 529 opposite to the outer ring surface 528 in radial directions relative to the axis (X), and a slit 526 extending parallel to the axis (X) from the inner ring surface 529 to the outer ring surface 528. The inner ring surface 529 includes an annular inner shoulder part 522 disposed transverse to the axis (X). The release ring 53 extends into the locking ring 52, is formed with a stop surface 533 that confronts the annular inner shoulder part 522 of the inner ring surface 529 of the locking ring 52, and is movable along the axis (X) relative to the locking ring 52 to a release position (as shown in FIG. 6), where the stop surface 533 is moved away from the annular inner shoulder part 522 of the inner ring surface 529 of the locking ring 52 and where the release ring 53 forces the grip ring 51 to release gripping action on the end portion of the water pipe 23 in the receiving space 400.

The seal ring 6 is disposed in the receiving space 400, and is adapted to abut sealingly against the end portion of the water pipe 23 in the receiving space 400.

The inner support tube 7 includes a support wall 71 adapted to be inserted into the end portion of the water pipe 23 received in the receiving space 400, and a support flange 72 extending radially and outwardly from the support wall 71 and adapted to abut against an end surface of the end portion of the water pipe 23.

In this embodiment, the housing wall of the tubular housing 4 further has an annular abutment surface 40 disposed in the receiving space 400 and spaced apart from the end face 41. The seal ring 6 is disposed in the receiving space 400 between the end face 41 and the annular abutment surface 40. The support flange 72 abuts against the annular abutment surface 40.

Moreover, the housing wall of the tubular housing 4 further has a fourth annular inner housing surface 48 disposed proximate to one end of the third annular inner housing surface 46 opposite to the second housing shoulder surface 45 and having a radial dimension relative to the axis (X) that is larger than the largest radial dimension of the third annular inner housing surface 46, a third housing shoulder surface 47 interconnecting the third and fourth annular inner housing surfaces 46, 48, and a fourth housing shoulder surface 49 connected to one end of the fourth annular inner housing surface 48 opposite to the third housing shoulder surface 46 and confronting the third housing shoulder surface 46. In addition, the seal ring 6 is disposed between the third and fourth housing shoulder surfaces 47, 49 of the housing wall, and abuts against the fourth annular inner housing surface 48.

Furthermore, the third annular inner housing surface 46 has a slanted part 461 extending radially and inwardly from the second housing shoulder surface 45 relative to the axis (X) away from the end face 41, and a connecting part 462 extending axially from one end of the slanted part 461 opposite to the second housing shoulder surface 45 to the third housing shoulder surface 47.

In addition, the grip ring 51 has an outer radial dimension smaller than the radial dimension of the first annular inner housing surface 42, and the largest radial dimension of the third annular inner housing surface 46 is smaller than the radial dimension of the first annular inner housing surface 42.

Additionally, the inner ring surface 529 of the locking ring 52 further has a first inner ring part 525 and a second inner ring part 527 with a radial dimension relative to the axis (X) smaller than that of the first inner ring part 525. The annular inner shoulder part 522 interconnects the first and second inner ring parts 525, 527. The outer ring surface 528 of the locking ring 52 has a first outer ring part 521, a second outer ring part 523 with a radial dimension relative to the axis (X) smaller than that of the first outer ring part 521, and an annular outer shoulder part 524 interconnecting the first and second outer ring parts 521, 523 and abutting against the first housing shoulder surface 43 of the housing wall.

In this embodiment, the grip ring 51 includes a flange portion 511 that is disposed in the receiving space 400 between the locking ring 52 and the second housing shoulder surface 45, and a plurality of claw portions 512 that extend inwardly in radial directions from the flange portion 511 toward the axis (X), that are slanted away from the locking ring 52, and that are adapted to grip the end portion of the water pipe 23 received in the receiving space 400.

The release ring 53 forces the claw portions 512 to move away from the end portion of the water pipe 23 when the release ring 53 is moved to the release position (shown in FIG. 6). In particular, the release ring 53 includes a surrounding wall 531 that is adapted to surround the end portion of the water pipe 23 received in the receiving space 400, and that has an urging surface 534, a sliding surface 535, and the stop surface 533. The urging surface 534 forces the claw portions 512 of the grip ring 51 to move away from the end portion of the water pipe 23 in the receiving space 400 when the release ring 53 is moved to the release position. The sliding surface 535 is disposed in slidable contact with the second inner ring part 527 of the inner ring surface 529 of the locking ring 52. The stop surface 533 interconnects the urging surface 534 and the sliding surface 535. The release ring 53 further includes an operating flange 532 that extends radially and outwardly from the surrounding wall 531, that is disposed externally of the locking ring 52 and the receiving space 400, and that is operable to move toward the end face 41 of the housing wall so as to dispose the release ring 53 at the release position (shown in FIG. 6). The urging surface 534 is an inclined surface extending in radial inward directions relative to the axis (X) away from the operating flange 532. In this embodiment, the release ring 53 has a diameter larger than an inner diameter of the locking ring 52 so that the locking ring 52 is slightly expanded when the release ring 53 extends into the locking ring 52.

Figure 9:
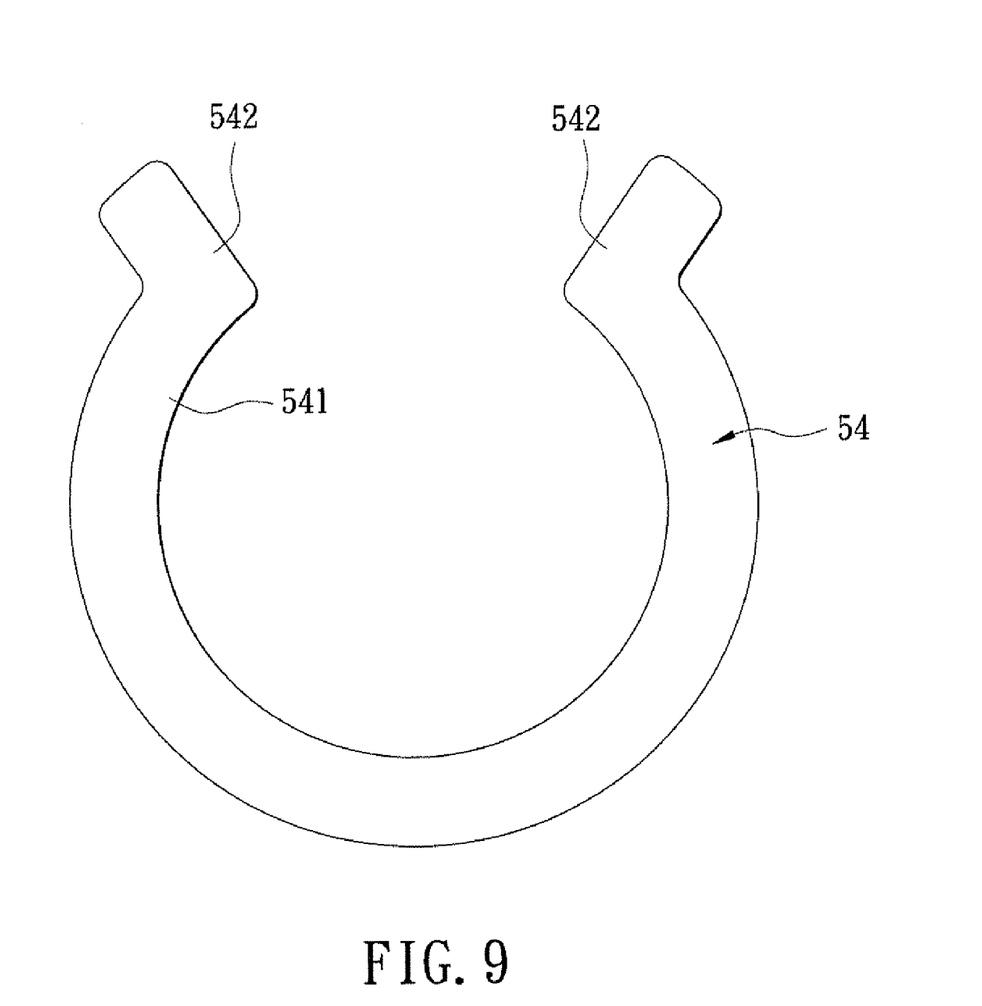
FIG. 9 is a schematic view of an embodiment of an anti-tamper ring.

Referring back to embodiments of FIG. 3 and FIG. 4, the quick pipe connector may further include an anti-tamper ring 54 disposed removably between the end face 41 of the housing wall of the tubular housing 4 and the operating flange 532 of the release ring 53. The anti-tamper ring 54 prevents movement of the release ring 53 toward the end face 41 of the housing wall, i.e., the anti-tamper ring 54 prevents the release ring 53 from being disposed at the release position (shown in FIG. 6), when the anti-tamper ring 54 is disposed between the end face 41 of the housing wall and the operating flange 532 of the release ring 53. With further reference to FIG. 9, in this embodiment, the anti-tamper ring 54 includes a C-shaped body 541 clipped removably on the release ring 53, and two protrusions 542 extending radially and outwardly from opposite ends of the C-shaped body 541, respectively. The C-shaped body 541 is expanded slightly by pulling apart the protrusions 542 to facilitate removal of the anti-tamper ring 54 from the release ring 53. It should be noted herein that the anti-tamper ring 54 does not interfere with connecting of the quick pipe connector to the water pipe 23.

The locking ring 52, the release ring 53 and the tubular housing 4 are designed with dimensions that facilitate retention of the grip ring 51, the locking ring 52 and the release ring 53 inside the receiving space 400 in the tubular housing 4 under normal operating conditions. Therefore, the quick pipe connector of the present invention does not require the provision of threads or deformation of the tubular housing 4 to retain the grip ring 51, the locking ring 52 and the release ring 53 within the receiving space 400 in the tubular housing 4.

According to this embodiment, the tubular housing 4 and the grip ring 51 are made from metal, the locking ring 52, the release ring 53 and the anti-tamper ring 54 are made from plastic, and the seal ring 6 is made from rubber.

Assembly of the quick pipe connector according to embodiments of the present invention includes the following steps:

1. The seal ring 6 is disposed in the receiving space 400 of the tubular housing 4 between the third and fourth shoulder surfaces 47, 49.

2. The inner support tube 7 is disposed in the receiving space 400 of the tubular housing 4 such that the support flange 72 of the inner support tube 7 abuts against the annular abutment surface 40 of the housing wall.

3. The grip ring 51 of the connecting unit 5 is disposed in the receiving space 400.

4. The locking ring 52 is contracted slightly and is then inserted into the receiving space 400 of the tubular housing 4.

5. The release ring 53 is extended into the locking ring 52, such that the locking ring 52 is slightly expanded, until the stop surface 533 confronts the annular inner shoulder part 522 of the inner ring surface 529 of the locking ring 52.

6. Optionally, the anti-tamper ring 54 is clipped on to the release ring 53 such that the anti-tamper ring 54 is disposed between the end face 41 of the housing wall of the tubular housing 4 and the operating flange 532 of the release ring 53.

Referring to FIG. 4 and FIG. 6, after the quick pipe connector is assembled, the end portion of the water pipe 23 may be inserted into the receiving space 400 of the tubular housing 4 such that an end surface of the end portion of the water pipe 23 abuts against the support flange 72 of the inner support tube 7. The release ring 53 is movable along the axis (X) relative to the locking ring 52 between a non-release position (shown in FIG. 4) and the release position (shown in FIG. 6). The end portion of the water pipe 23 is maintained in the receiving space 400 when the release ring 53 is disposed at the non-release position, where the urging surface 534 of the release ring 53 is spaced apart from the claw portions 512 of the grip ring 51, and where the end portion of the water pipe 23 is gripped by the claw portions 512. To move the release ring 53 to the release position, the operating flange 532 of the release ring 53 is operated to move toward the end face 41 of the housing wall such that the stop surface 533 is moved away from the annular inner shoulder part 522 of the inner ring surface 529 of the locking ring 52, and such that the urging surface 534 is disposed in contact with the claw portions 512 of the grip ring 51 and forces the claw portions 512 to move away from the end portion of the water pipe 23 in the receiving space 400. The end portion of the water pipe 23 may be removed from the receiving space 400 when the release ring 53 is disposed at the release position.

The quick pipe connector of the present invention has the following advantages:

1. Since the connecting unit 5 may include only three components 51~53, the structure of the quick pipe connector is relatively simple as compared to the prior art.

2. Since only five steps may be used to assemble the quick pipe connector, and since no extra processing tool is required, the assembly process of the quick pipe connector is relatively easy and simple. In addition, without the step of disposing the inner support tube 7 in the receiving space 400 of the tubular housing 4, the assembly process is reduced to four steps.

3. Since the locking ring 52, the release ring 53, and the tubular housing 4 are designed with dimensions that facilitate retention of the grip ring 51, the locking ring 52 and the release ring 53 inside the receiving space 400 in the tubular housing 4 under normal operating conditions, unlike the prior art, embodiments of the quick pipe connector of the present invention does not require the provision of threads or deformation of the tubular housing 4 to retain the grip ring 51, the locking ring 52 and the release ring 53 within the receiving space 400 in the tubular housing 4.

4. Since the seal ring 6 is isolated from the connecting unit 5 by the third housing shoulder surface 47 of the housing wall of the tubular housing 4, damages caused by water pressure will not result in the connecting unit 5. Therefore, the quick pipe connector is relatively durable as compared to the prior art.

5. Since contraction of the tubular housing 4 is no longer required, damage to the connecting unit 5 caused by the contraction step is eliminated.

6. In the prior art, a structure similar to the operating flange 532 disclosed in the present invention cannot be provided on the release ring 123 of the conventional quick pipe connector 1 (as shown in FIG. 1) because doing so prevents the release ring 123 from being disposed in the outer locking ring 122. As such, the U-shaped pushing tool 22 is required to move the release ring 123 to the release position, making the conventional quick pipe connector 1 inconvenient to use. On the contrary, a user may operate the operating flange 532 directly to move the release ring 53 to the release position (shown in FIG. 6), making the quick pipe connector of embodiments of the present invention convenient to use.

7. The operating flange 532 of the release ring 53 not only provides a spot for labeling, but also provides a structural protection to the tubular housing 4. Therefore, the tubular housing 4 is protected from damages when the quick pipe connector is dropped on the floor.

Figure 7:
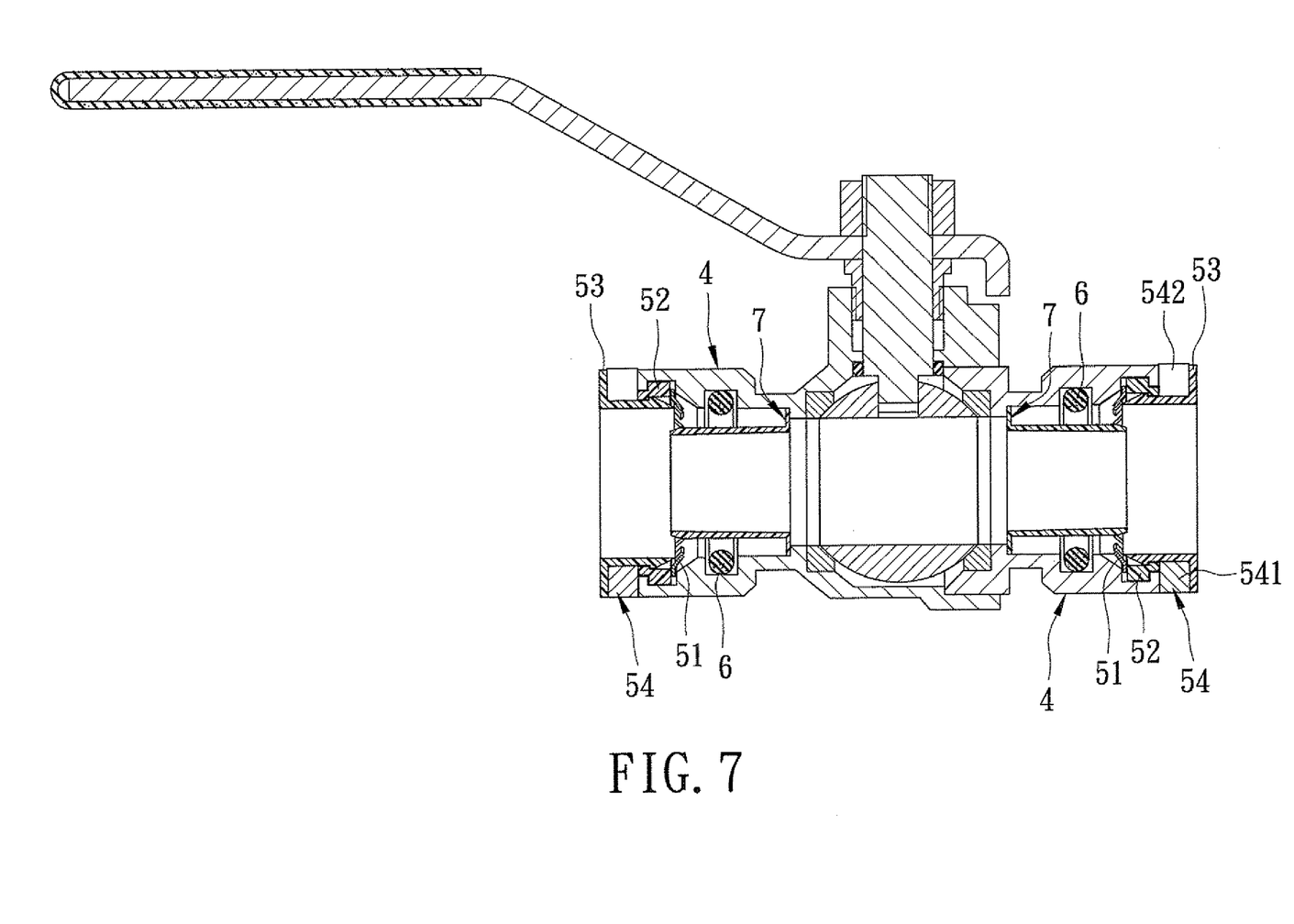
FIG. 7 is a sectional view of an embodiment of a ball valve incorporating the quick pipe connector.
Figure 8:
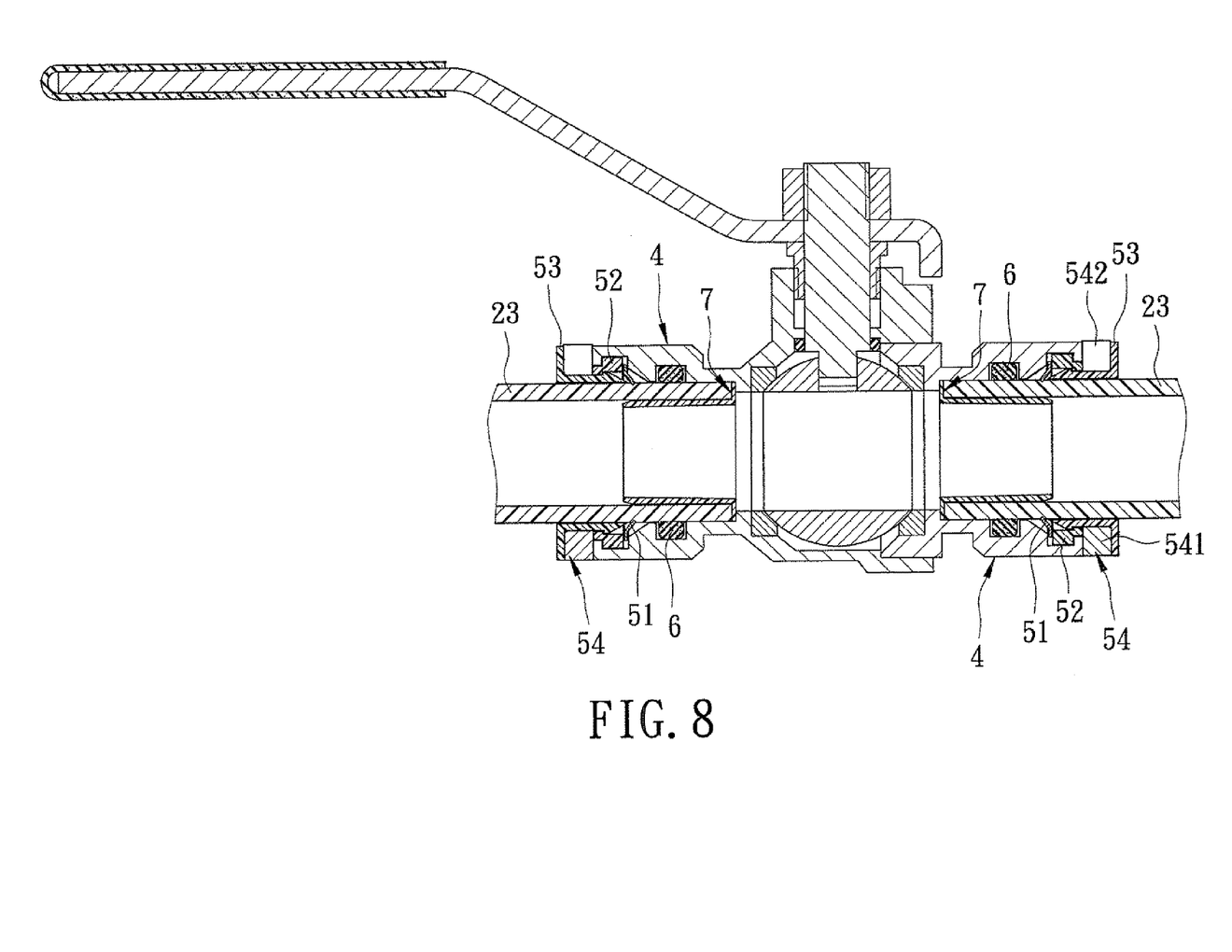
FIG. 8 is a sectional view of the ball valve when connected to a water pipe.

It should be noted herein that the quick pipe connector may be formed into various kinds of connectors, including but not limited to T-joint connectors, valve connectors, pump connectors, etc., in other embodiments of the present invention. An example in which the quick pipe connector is formed into a ball valve is illustrated in FIG. 7 and FIG. 8. Since operations and functions related to the ball valve are identical to those disclosed hereinabove, further details of the same are omitted herein for the sake of brevity.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A quick pipe connector adapted for connecting to and disconnecting from a water pipe, said quick pipe connector comprising:

a tubular housing including a housing wall that defines an axis and a receiving space adapted for receiving an end portion of the water pipe, and that has an end face, a first annular inner housing surface connected to said end face, a second annular inner housing surface disposed proximate to one end of said first annular inner housing surface opposite to said end face and having a radial dimension relative to the axis that is larger than that of said first annular inner housing surface, a first housing shoulder surface interconnecting said first and second annular inner housing surfaces, a third annular inner housing surface disposed proximate to one end of said second annular inner housing surface opposite to said first housing shoulder surface and having a largest radial dimension relative to the axis that is smaller than that of said second annular inner housing surface, and a second housing shoulder surface interconnecting said second and third annular inner housing surfaces;

a connecting unit including a grip ring disposed in said receiving space of said tubular housing and adapted to grip the end portion of the water pipe in said receiving space, a locking ring disposed in said receiving space such that said locking ring abuts against said first housing shoulder surface and positions said grip ring in said receiving space so that said grip ring abuts against said second housing shoulder surface, said locking ring having an outer ring surface, an inner ring surface opposite to said outer ring surface in radial directions relative to the axis, and a slit extending parallel to the axis from said inner ring surface to said outer ring surface, said inner ring surface including an annular inner shoulder part disposed transverse to the axis, and a release ring extending into said locking ring, formed with a stop surface that confronts said annular inner shoulder part of said inner ring surface of said locking ring, and movable along the axis relative to said locking ring to a release position, where said stop surface is moved away from said annular inner shoulder part of said inner ring surface of said locking ring and where said release ring forces said grip ring to release gripping action on the end portion of the water pipe in said receiving space; and a seal ring disposed in said receiving space and adapted to abut sealingly against the end portion of the water pipe in said receiving space.

2. The quick pipe connector as claimed in claim 1, wherein said grip ring includes a flange portion that is disposed in said receiving space between said locking ring and said second housing shoulder surface, and a plurality of claw portions that extend inwardly in radial directions from said flange portion toward the axis, that are slanted away from said locking ring, and that are adapted to grip the end portion of the water pipe received in said receiving space, said release ring forcing said claw portions to move away from the end portion of the water pipe when said release ring is moved to the release position.

3. The quick pipe connector as claimed in claim 2, wherein:
said release ring includes a surrounding wall that is adapted to surround the end portion of the water pipe received in said receiving space, and that has
an urging surface for forcing said claw portions of said grip ring to move away from the end portion of the water pipe in said receiving space when said release ring is moved to the release position, a sliding surface disposed in slidable contact with said inner ring surface of said locking ring, and said stop surface interconnecting said urging surface and said sliding surface; and said release ring further includes an operating flange that extends radially and outwardly from said surrounding wall, that is disposed externally of said locking ring and said receiving space, and that is operable to move toward said end face of said housing wall so as to dispose said release ring at the release position.

4. The quick pipe connector as claimed in claim 3, wherein said urging surface is an inclined surface extending in radial inward directions relative to the axis away from said operating flange.

5. The quick pipe connector as claimed in claim 1, wherein said housing wall of said tubular housing further has a fourth annular inner housing surface disposed proximate to one end of said third annular inner housing surface opposite to said second housing shoulder surface and having a radial dimension relative to the axis that is larger than the largest radial dimension of said third annular inner housing surface, a third housing shoulder surface interconnecting said third and fourth annular inner housing surfaces, and a fourth housing shoulder surface connected to one end of said fourth annular inner housing surface opposite to said third housing shoulder surface and confronting said third housing shoulder surface, said seal ring being disposed between said third and fourth housing shoulder surfaces and abutting against said fourth annular inner housing surface.

6. The quick pipe connector as claimed in claim 1, wherein:

said inner ring surface of said locking ring further has a first inner ring part and a second inner ring part with a radial dimension relative to the axis smaller than that of said first inner ring part, said annular inner shoulder part interconnecting said first and second inner ring parts;

said outer ring surface of said locking ring having a first outer ring part, a second outer ring part with a radial dimension relative to the axis smaller than that of said first outer ring part, and an annular outer shoulder part interconnecting said first and second outer ring parts and abutting against said first housing shoulder surface of said housing wall.

7. The quick pipe connector as claimed in claim 1, wherein said third annular inner housing surface has a slanted part extending radially and inwardly from said second housing shoulder surface relative to the axis away from said end face, and a connecting part extending axially from one end of said slanted part opposite to said second housing shoulder surface.

8. The quick pipe connector as claimed in claim 1, further comprising an inner support tube that includes a support wall adapted to be inserted into the end portion of the water pipe received in said receiving space, and a support flange extending radially and outwardly from said support wall and adapted to abut against an end surface of the end portion of the water pipe, said housing wall of said tubular housing further having an annular abutment surface disposed in said receiving space and spaced apart from said end face, said seal ring being disposed in said receiving space between said end face and said annular abutment surface, said support flange abutting against said annular abutment surface.

9. The quick pipe connector as claimed in claim 1, wherein said tubular housing and said grip ring are made from metal, said locking ring and said release ring are made from plastic, and said seal ring is made from rubber.

10. The quick pipe connector as claimed in claim 1, wherein said grip ring has an outer radial dimension smaller than the radial dimension of said first annular inner housing surface, and the largest radial dimension of said third annular inner housing surface is smaller than the radial dimension of said first annular inner housing surface.

* * * * *